June 28, 1955 R. A. VON BEHREN 2,711,901

MAGNETIC RECORDING TAPE AND METHOD OF MAKING SAME

Filed May 21, 1952

INVENTOR
ROBERT A. VON BEHREN
BY
Carpenter, Abbott, Coulter & Kinney
ATTORNEYS

United States Patent Office 2,711,901
Patented June 28, 1955

2,711,901

MAGNETIC RECORDING TAPE AND METHOD OF MAKING SAME

Robert A. von Behren, St. Paul, Minn., assignor to Minnesota Mining & Manufacturing Company, St. Paul, Minn., a corporation of Delaware Application May 21, 1952, Serial No. 289,114

5 Claims. (Cl. 274—41.4)

This invention relates to magnetic recording tape having novel magnetic characteristics, and to a method of making the same.

Magnetic recording tape commonly comprises magnetically susceptible particles dispersed throughout a flexible non-magnetic binder, furnished in the form of a thin, narrow tape or ribbon. In one well-known exemplification, a mixture of magnetic iron oxide particles in a solution of a resinous binder is coated on a cellulose acetate film and dried. The cellulose acetate acts as a carrier web for the magnetic layer and in addition serves as a spacer between adjacent layers of the tape when in roll form, thus minimizing "cross-talk." The resinous binder serves to immobilize the layer of magnetic particles and to bind the same to the carrier web. The magnetic particles accept and retain the magnetically impressed signal. In other constructions, a thin treated or untreated paper web replaces the cellulose acetate or other film; or the separate carrier web is eliminated and the magnetic particles are uniformly dispersed throughout the entire thickness of the resinous binder and carrier film.

In use, the magnetic recording tape is drawn past a magnetic recording head where a magnetic pattern, corresponding to the sound vibrations or other information which it is desired to record, is impressed upon the tape. When the tape is subsequently drawn at the same speed past a magnetic reproducing head, the magnetic pattern induces a corresponding electric current in the windings of the reproducing head and makes possible the reproduction of the originally recorded signal. The magnetic pattern on the tape may be subsequently magnetically erased, and other signals recorded. The entire process is known as "magnetic recording," and the tape employed is known as "magnetic recording tape." Variants such as belts, discs, rods, filaments and the like may also be considered as coming within the scope of this generic designation.

My invention is concerned with the proper positioning of the magnetically susceptible particles within the binder, and with the improved product obtainable thereby. I have found that orientation of magnetically anisotropic particles in accordance with the novel procedure hereinafter to be described results in a combination of properties heretofore not available in any magnetic recording tape product known to me. The amplitude of the signal obtainable from the tape is independent of the direction of tape travel during recording. The residual induction of a specimen of the tape taken in the longitudinal direction, i. e. the direction the tape travels past the magnetic heads, is at least 1.3 times, and may be up to nearly twice, that of a comparable specimen taken in the crosswise direction. The thickness of coating required is greatly reduced. The noise level of the tape is significantly reduced, i. e., the ratio of signal to noise is increased.

Figure 1:
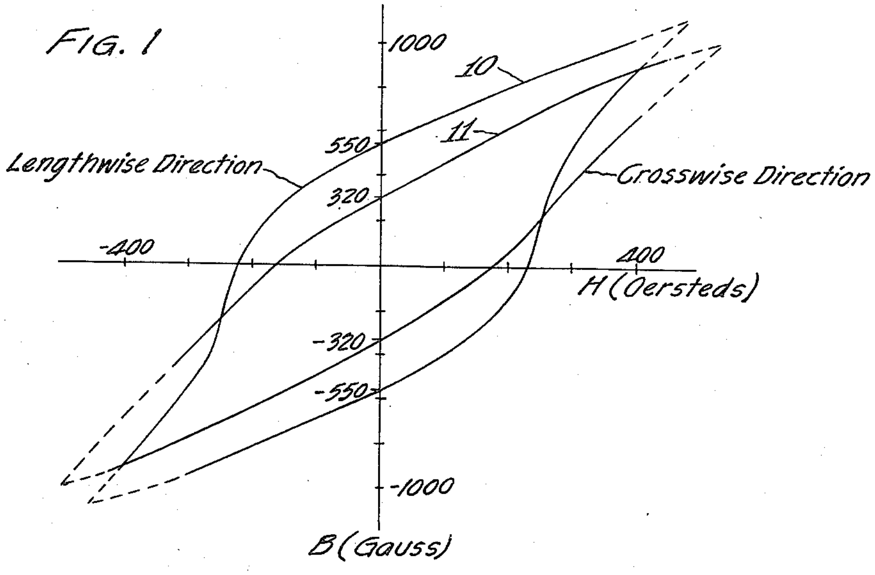
Figure 2:
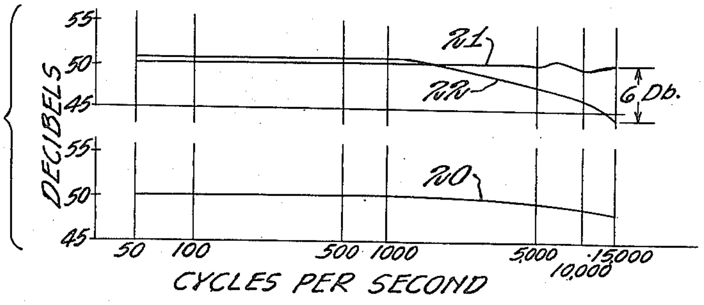
Figure 3:
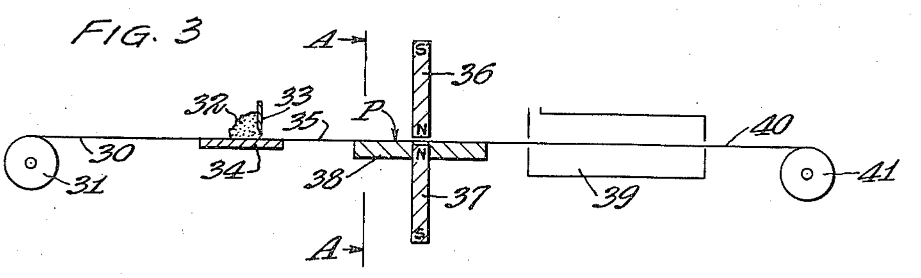

In the drawing, Figure 1 illustrates, in the form of comparative hysteresis loops, the significant improvement in useful residual induction obtained in a typical magnetic recording tape by means of my novel method. Figure 2 illustrates the non-directional aspects of my novel tape product as compared to previously available products. Figure 3 presents in schematic form one system, a detail of which is presented in elevation in Figure 4, for preparing and treating magnetic recording tape in accordance with my invention.

As indicated in Figure 3, a carrier web 30, such as a thin cellulose acetate film, is drawn from stock roll 31 through a coating device here illustrated by a bed-plate 34 and a coating knife or doctor blade 33, where the magnetic dispersion 32, consisting essentially of magnetically anisotropic particles uniformly dispersed in a solution of a flexible binder, is applied in a thin uniform coating to one surface of the web. The coated web 35 then immediately passes centrally between the closely adjacent opposed poles of two strong permanent bar magnets 36 and 37, being supported and guided by a table 38, the flat upper surface of which is perpendicular to the axial plane of the two magnets. The arrangement of magnets 36 and 37, table 38, and coated web 35, is shown in elevation in Figure 4, as viewed from section A—A of Figure 3, the north and south poles of the bar magnets being indicated as "N" and "S" in these figures. Thereafter the binder is hardened, e. g. by removal of volatile solvent in an oven 39, and the finished magnetic recording tape product 40 is wound up on temporary storage drum 41. The tape may be produced in narrow widths, or may more economically be coated, treated and dried in wider strips and subsequently slit to the desired widths for use.

Coating of the magnetic material on the carrier web may be accomplished by roll coater, spray application, or in any other desired manner, provided a sufficiently thin and uniform coating is produced. The binder component of the coating must be sufficiently fluid and plastic, when the sheet passes between the magnets 36 and 37, to allow the magnetic particles to move into an oriented position. Thereafter the particles are held in such oriented position, as the coating hardens, by the residual induced magnetic forces.

Binder materials such as plasticized cellulose esters and ethers, polyvinyl resins, certain acrylate resins, blends of polyvinyl resins with rubbery butadiene-acrylonitrile polymers, and many other polymeric or resinous flexible film-forming organic materials which are soluble in suitable organic solvents to produce fluid solutions are particularly suitable for the purposes of my invention. A degree of fluidity which is adequate to permit coating of the mixture on the carrier web is found to be adequate also to permit the desired re-orientation of the magnetic particles. Thermoplastic binders are less easily handled, and require somewhat more complicated coating apparatus, but are nonetheless applicable; in such cases, the coating must be heated and rendered fluid just prior to its passage through the magnetic field, and thereafter is again permitted to cool and harden. Self-setting or self-polymerizing binders, which polymerize when heated or otherwise activated, are also useful. No temperature restrictions need be imposed in such cases, provided only that components of the tape are not degraded or volatilized, and that the Curie point of the magnetic particles is not reached after the material has passed between the magnets 36 and 37.

The principle described is equally applicable to magnetic recording tape structures wherein the magnetic particles are distributed throughout the entire thickness of the web. In such cases it is necessary to support the temporarily liquid mixture of particles and binder on a non-magnetic temporary carrier web, or between two such webs, for passage between the magnetic poles and until the binder is fully solidified, after which the carrier web is stripped away. The same principle is applicable to the formation of many magnetically oriented structures other than flexible sheet materials, e. g. rigid sheets or thin bars.

Figure 4:
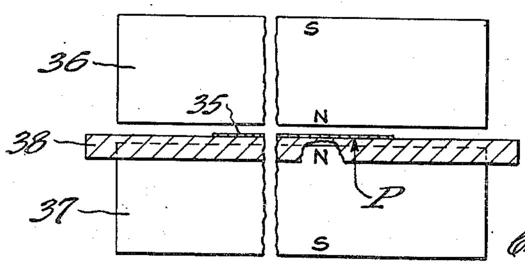

In a specific example, two parts by weight of acicular magnetic iron oxide particles were uniformly dispersed in a liquid solution of one part of a water-insoluble resinous polymeric binder in an appropriate volatile organic solvent, and coated in a thin uniform layer on a cellulose acetate film. Within a few seconds after coating, the sheet was passed between the closely adjacent opposed or like poles of two bars magnets, after which it was passed through an oven where the binder was solidified and hardened by removal of solvent. In the particular example, the two opposed magnetic poles were both north poles, as shown in Figures 3 and 4; but opposed south poles are equally effective.

The bar magnets employed were equally magnetized bars of high-permeability alloy ("Alnico VI") having a cross-section of ½ inch by 3 inches, and of a length sufficient to overlap each side of the coated tape a distance of 3 inches. The opposing pole surfaces were spaced ½ inch apart, and a non-magnetic flat table having a width of three inches was centrally located therebetween, the surfaces of the table being so placed that the tape in sliding over it was held in a plane exactly midway between the two pole surfaces and perpendicular to the axial plane of the two bar magnets.

The strength of the magnets was such that a flux-measuring instrument (GE "Gauss-Meter") recorded a magnetic flux of approximately 600 gauss at a point "P" on the surface of the table three-fourth inch from the axial plane of the two magnets. This flux density was found to be more than adequate with the coatable fluid mixture of resinous binder and magnetic particles hereinbefore described. Permanent magnets provide an economical means of producing the required high-intensity, uniform magnetic field, and are much preferred. Suitable electromagnets are considered as being fully equivalent, but obviously are more expensive to operate, and introduce additional variables, e. g. variations in temperature.

The resulting magnetic recording tape product was tested for directional effects. In this connection, the tape is considered to be moving "forward" when it passes through the magnetic recorder in the same direction in which it passed between the bar magnets during manufacture, and "backward" when it travels in the reverse direction.

Sine wave and other signals at several frequencies within the range of 50 to 15,000 cycles per second were recorded, and the strength of the signal output obtained on playback was determined. The tests were made in both the forward and the backward direction, using an "Ampex Model 300" professional type magnetic recorder. The same test was carried out on magnetic recording tape of equivalent composition but which had been drawn over a "horse-shoe" magnet just prior to hardening, rather than between the opposing magnetic poles as herein described in connection with Figure 3. A single bar magnet, such as magnet 37 of Figure 3, produces the same type of results as does such a "horseshoe" magnet. Results are represented by the curves of Figure 2 of the drawing, separated along the Y axis for greater clarity, showing the output in decibels obtained with input signals of various frequencies. Curve 20, which is in reality two superimposed identical curves, represents the output for the tape product of this invention, produced as hereinbefore described, and recorded (and played back) both in the forward and in the backward direction. Curve 21 illustrates the results obtained with tape processed with a horse-shoe magnet, as above noted, and operating in the forward direction; curve 22 shows the results obtained when the same tape was operated in the backward direction. It will be observed that, while only slight differences in output amplitude between curves 21 and 22 are obtained at the lower frequencies, these differences become more and more distinct as the frequency is increased. At 15,000 cycles per second, the difference in output amplitude for curves 21 and 22 was approximately 6 decibels, which is easily noticeable to the ear in the reproduction of music and voice signals. Since many magnetic tape recorders operate in both directions, it is apparent that uniform high fidelity recording and reproduction can not be obtained on such apparatus with magnetic recording tape having the properties illustrated in curves 21 and 22 of Figure 2. On the other hand, my novel magnetic recording tape produce has a substantially identical ratio of output to input amplitude in both directions of tape travel, at all frequencies, as indicated by curve 20.

The tape was also tested for residual induction. In this test, a narrow sample of the tape is inserted within a test coil which in turn is located within a relatively very large field coil. An alternating potential is impressed across the terminals of the field coil, providing an alternating high-intensity magnetizing force, and the resulting changes in magnetic flux density in the sample with changes in the magnetizing force applied are determined by means of an oscilloscope connected to the test coil.

Typical oscilloscope patterns obtained from samples of tape produced according to the present invention, as hereinabove described, are illustrated in Figure 1, in which curves 10 and 11 were obtained with samples of the coated tape product taken in a lengthwise and crosswise direction, respectively, the lengthwise direction representing the direction in which the tape moves past the magnetic heads during use. These curves are corrected for thickness of magnetic layer, data being represented in terms of unit thickness. The ends of the experimentally determined curves are shown connected by dotted lines, for convenience in reading.

It will be seen that curve 10, for the sample taken in the lengthwise or playing direction, intersects the "B" or flux density axis at 550 gauss, whereas curve 11, representing the sample taken in the crosswise direction at right angles to the direction of motion of the tape during magnetic recording, intersects the "B" axis at only 320 gauss. Thus the ratio of the residual induction in the playing direction to that in the crosswise direction is, in this instance, $$\frac{550}{320}=1.72$$

Similar tests made on other magnetic recording tapes produced in accordance with the principles of my invention as herein set forth have resulted in ratios of up to about 2.0, and in all cases the ratio has been at least as high as 1.3. Magnetic recording tapes made by conventional methods sometimes show a slightly greater residual induction in the lengthwise direction than in the crosswise direction, due presumably to a physical orientation of physically anisotropic magnetic particles during the coating operation; but the ratio thus obtained is in all cases much less than 1.3.

Since the flux density per unit of thickness is thus substantially increased, a much improved signal-to-noise ratio is obtained on playback. For the same reason, a substantial reduction in the thickness of the magnetic layer may be made without reducing the output signal, where the tape is treated in accordance with the principles hereinabove set forth.

I claim:

1. In the manufacture of magnetic recording tape comprising magnetically oriented, magnetically anisotropic ferromagnetic particles in a binder and characterized by substantially identical ratio of output to input amplitude in both directions of tape travel at all frequencies and by a ratio of residual induction in the direction of tape travel to residual induction in the crosswise direction of at least about 1.3, the method comprising applying to a carrier web a thin layer of a composition comprising magnetically anisotropic ferromagnetic particles in a fluid binder, passing the thus coated web in its longitudinal direction along a plane midway between two closely spaced magnetic poles of like polarity providing a centrally located flat magnetic field extending longitudinally of said web across the entire coated width thereof and of a strength sufficient to cause orientation of said particles, and then solidifying said binder.

2. Magnetic recording tape comprising magnetically anisotropic ferromagnetic particles in a binder, said particles being magnetically oriented in a plane substantially parallel to the plane of the tape product and parallel to the longitudinal direction of the tape product, said tape being characterized by substantially identical ratio of output to input amplitude in both directions of tape travel at all frequencies and by a ratio of residual induction in the direction of tape travel to residual induction in the crosswise direction of at least about 1.3.

3. Magnetic recording tape according to claim 2, in which the ratio of residual induction in the direction of tape travel to residual induction in the crosswise direction is at least about 1.7.

4. Magnetic recording tape comprising a thin non-magnetic carrier web carrying a coating, firmly bonded thereto, comprising magnetically anisotropic ferromagnetic particles in a binder, said particles being magnetically oriented in a plane substantially parallel to the plane of the tape product and parallel to the longitudinal direction of the tape product, said tape being characterized by substantially identical ratio of output to input amplitude in both directions of tape travel at all frequencies and by a ratio of residual induction in the direction of tape travel to residual induction in the crosswise direction of at least about 1.3.

5. In the manufacture of magnetic recording tape comprising magnetically oriented, magnetically anisotropic ferromagnetic particles in a binder and characterized by substantially identical ratio of output to input amplitude in both directions of tape travel at all frequencies and by a ratio of residual induction in the direction of tape travel to residual induction in the crosswise direction of at least about 1.3, the method comprising applying to a carrier web a thin layer of a composition comprising magnetically anisotropic ferromagnetic particles in a fluid binder, passing the thus coated web in its longitudinal direction along a plane coincident with a flat magnetic field in which the lines of force extend longitudinally of said web across the entire coated width thereof and which is of a strength sufficient to cause orientation of said particles, and then solidifying said binder.

References Cited in the file of this patent

UNITED STATES PATENTS

| | | |
|---|---|---|
| 1,949,840 | Languepin | Mar. 6, 1934 |
| 2,418,479 | Pratt et al. | Apr. 8, 1947 |
| 2,509,780 | O'Dea | May 30, 1950 |
| 2,550,803 | Goodard | May 1, 1951 |
| 2,559,505 | Hillier | July 3, 1951 |
| 2,594,893 | Faus | Apr. 29, 1952 |

FOREIGN PATENTS

| | | |
|---|---|---|
| 587,916 | Germany | Nov. 10, 1933 |